(12) United States Patent
Jotwani

(10) Patent No.: US 12,450,839 B1
(45) Date of Patent: Oct. 21, 2025

(54) MODIFYING VISUAL CONTENT BASED ON USER POSITION

(71) Applicant: Apple Inc., Cupertino, CA (US)

(72) Inventor: Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/973,634

(22) Filed: Oct. 26, 2022

Related U.S. Application Data

(60) Provisional application No. 63/272,703, filed on Oct. 28, 2021.

(51) Int. Cl.
G06T 19/00 (2011.01)
G06F 3/01 (2006.01)

(52) U.S. Cl.
CPC ............ G06T 19/006 (2013.01); G06F 3/011 (2013.01)

(58) Field of Classification Search
CPC ............................... G06T 19/006; G06F 3/011
USPC ......................................................... 345/633
See application file for complete search history.

(56) References Cited

U.S. PATENT DOCUMENTS

| | | | |
|---|---|---|---|
| 9,489,724 B2 | 11/2016 | Davies et al. | |
| 10,403,043 B2 | 9/2019 | Kaufman et al. | |
| 10,416,769 B2 | 9/2019 | Ofek et al. | |
| 10,650,600 B2 | 5/2020 | Jones et al. | |
| 10,885,710 B2 | 1/2021 | Holz et al. | |
| 2006/0211462 A1* | 9/2006 | French | A63F 13/213 463/1 |
| 2010/0261526 A1* | 10/2010 | Anderson | G06F 3/016 345/157 |
| 2015/0379777 A1* | 12/2015 | Sasaki | G02B 27/0176 345/633 |
| 2017/0031503 A1* | 2/2017 | Rosenberg | G06F 3/045 |
| 2017/0069142 A1* | 3/2017 | Elmekies | G06F 3/005 |
| 2019/0019032 A1* | 1/2019 | Bostick | G06V 20/20 |
| 2020/0027194 A1 | 1/2020 | Nourai et al. | |
| 2020/0225495 A1* | 7/2020 | Kiemele | G02B 27/0179 |
| 2020/0258278 A1* | 8/2020 | Mirhosseini | G06T 7/292 |
| 2020/0284605 A1* | 9/2020 | Sakai | G01C 21/3647 |
| 2020/0307617 A1* | 10/2020 | Sakai | B60R 1/24 |
| 2020/0357094 A1 | 11/2020 | Liebenow et al. | |

(Continued)

FOREIGN PATENT DOCUMENTS

WO 2018106898 A1 6/2018

*Primary Examiner* — Jin Ge

(74) *Attorney, Agent, or Firm* — Fernando & Partners, LLP

(57) ABSTRACT

Various implementations disclosed herein include devices, systems, and methods for warping visual content based on a current trajectory of a user relative in a physical environment. In some implementations, a device includes a display, an environmental sensor, one or more processors and a non-transitory memory. In some implementations, a method includes obtaining visual content corresponding to a graphical environment that is different from a physical environment of the device. In some implementations, the method includes detecting, via the environmental sensor, a current trajectory of the user in the physical environment. In some implementations, the method includes generating warped visual content by warping the visual content in response to an indication that the current trajectory of the user intersects with a physical object in the physical environment. In some implementations, the method includes displaying the warped visual content on the display.

19 Claims, 11 Drawing Sheets

(56) References Cited

U.S. PATENT DOCUMENTS

2020/0371596 A1 11/2020 Lee
2021/0082083 A1 3/2021 Leong

* cited by examiner

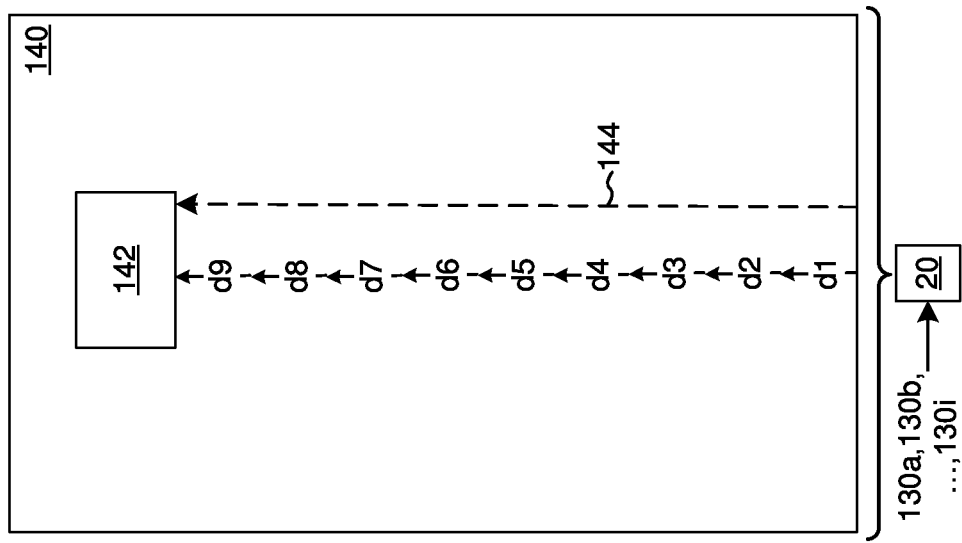
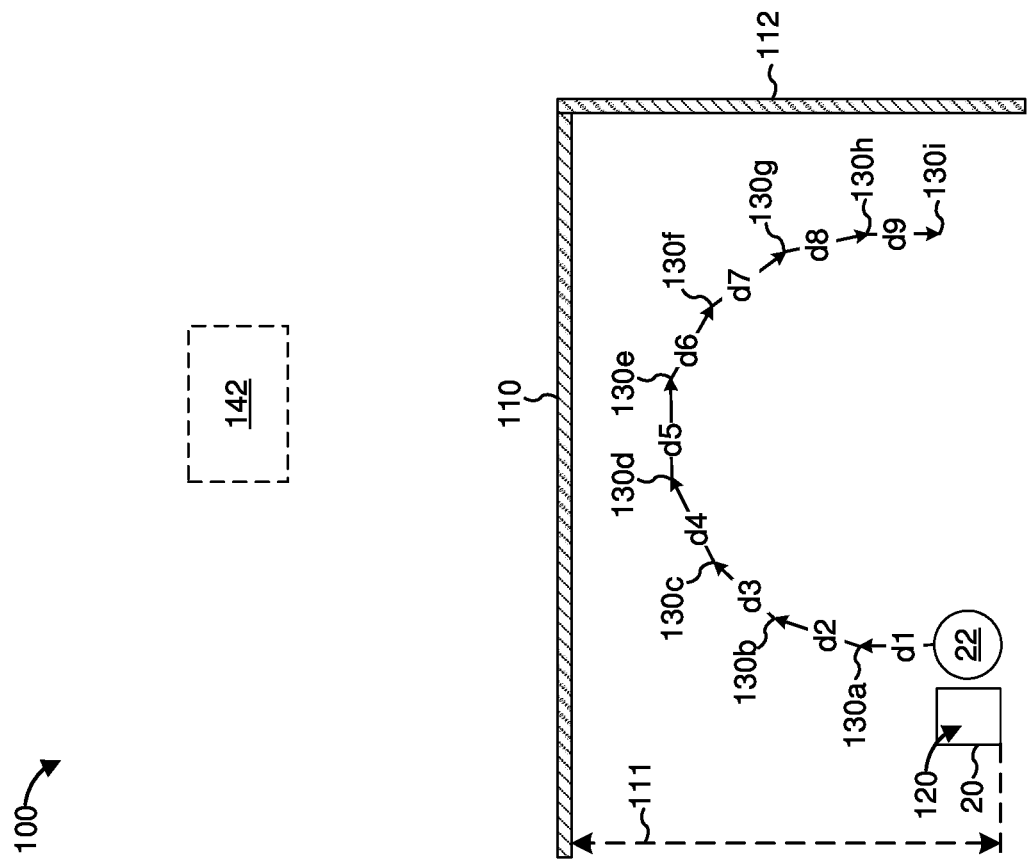
Figure 1E
Figure 1D

MODIFYING VISUAL CONTENT BASED ON USER POSITION

CROSS-REFERENCE TO RELATED APPLICATION

This application claims the benefit of U.S. Provisional Patent App. No. 63/272,703, filed on Oct. 28, 2021, which is incorporated by reference in its entirety.

TECHNICAL FIELD

The present disclosure generally relates to modifying visual content based on user position.

BACKGROUND

Some devices include a display that presents visual content. Some users view the visual content while navigating a physical environment that includes various physical objects. Some users collide with a physical object in the physical environment while viewing the visual content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1E are diagrams of an example operating environment in accordance with some implementations.

Figure 1C:
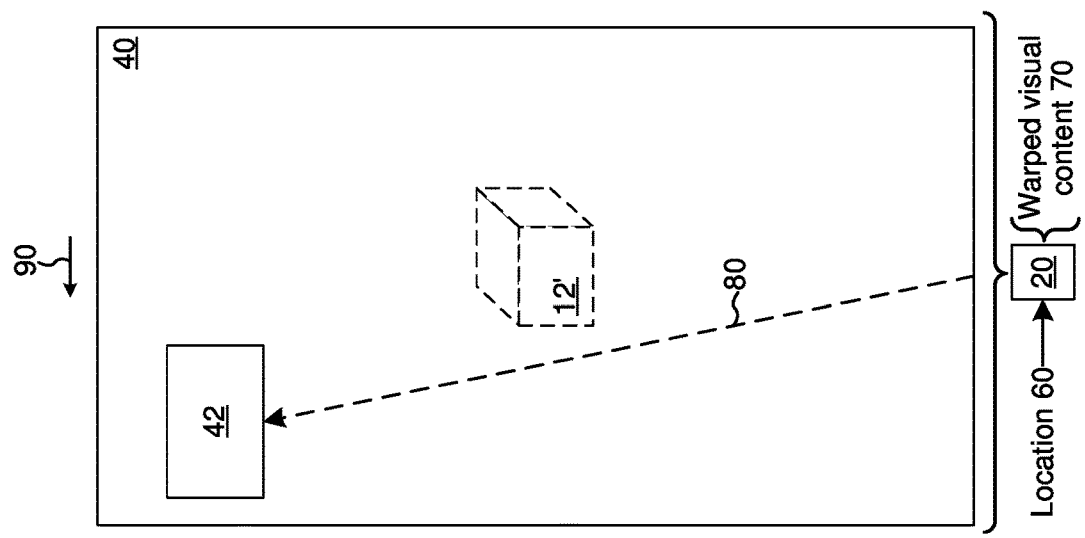

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for warping visual content based on a current trajectory of a user in a physical environment. In some implementations, a device includes a display, an environmental sensor, one or more processors and a non-transitory memory. In some implementations, a method includes obtaining visual content corresponding to a graphical environment that is different from a physical environment of the device. In some implementations, the method includes detecting, via the environmental sensor, a current trajectory of the user within the physical environment. In some implementations, the method includes generating warped visual content by warping the visual content in response to an indication that the current trajectory of the user intersects with a physical object in the physical environment. In some implementations, the method includes displaying the warped visual content on the display.

Various implementations disclosed herein include devices, systems, and methods for warping visual content based on a difference between a current movement of a user and an expected movement. In some implementations, a device includes a display, an image sensor, a movement sensor, one or more processors and a non-transitory memory. In some implementations, a method includes displaying, on the display, visual content that represents a pass-through of a physical environment of the device. In some implementations, the method includes detecting, via the movement sensor, a current movement of a user of the device. In some implementations, the method includes generating warped visual content by warping the visual content in response to a difference between the current movement and an expected movement being greater than a threshold. In some implementations, the method includes displaying the warped image on the display.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A device may include motion sensors that detect a user's movement in a physical environment. The movement in the physical environment may be translated into a movement of a virtual object (e.g., an avatar of the user) in a virtual environment. When virtual dimensions of the virtual environment are much greater than physical dimensions of the physical environment, it is difficult to navigate the entire virtual environment. For example, the user may collide with physical objects in the physical environment. Additionally, the user may get dizzy by going in loops in the physical environment. As such, there is a need for navigating large virtual environments while the user is present in a relatively small physical environment such as a hallway, a living room or an office.

The present disclosure provides methods, systems, and/or devices for warping images of a virtual environment based on a location of a user relative to physical objects in a physical environment. A device warps images of the virtual environment based on a location of the user relative to physical objects in the physical environment in order to prevent the user from colliding with the physical objects. As an example, the user may be required to walk on a straight path in the virtual environment. However, walking on a straight path in the physical environment may result in the user colliding with a coffee table. In order to avoid colliding with the coffee table the user may have to veer right. In this example, the device warps (e.g., shifts) the image of the straight virtual path towards the right in order to provide an appearance that the user is walking towards the left on the straight virtual path and may soon go off course. The warped image triggers the user to start walking towards the right in order to stay on course and avoid the physical coffee table. The warping is gradual so that the user does not observe sudden changes in his physical path. The device can use audio cues to trigger the user to turn in a certain direction. For example, if the user needs to turn right to avoid the physical coffee table, then the device can play a bird chirping sound that emanates from the right in order to trigger the user to turn towards the right.

Figure 1B:
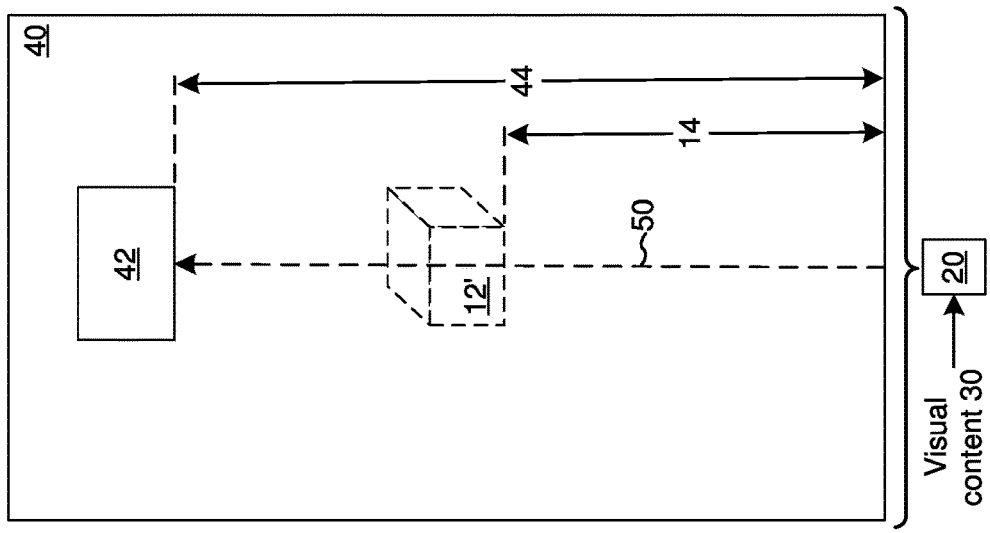
Figure 1A:
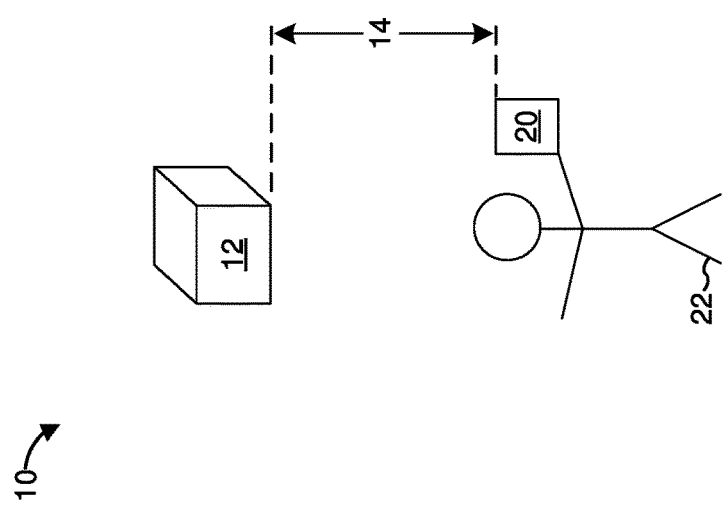

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a physical object 12, an electronic device 20 and a user 22 of the electronic device 20. Although FIG. 1A illustrates a single physical object, in some implementations, the physical environment 10 includes multiple physical objects.

In some implementations, the physical environment 10 corresponds to a private location such as a physical space within a home of the user 22. For example, the physical environment 10 may include a living room, a dining room, a kitchen, a family room, a home office, a bedroom, a garage, a basement or a hallway within the home of the user 22. As such, the physical environment 10 may include various physical objects that are found in a typical home. For example, the physical environment 10 may include a table, chairs, a couch, a coffee table, a television, a bed, walls, etc.

In some implementations, the electronic device 20 includes a handheld computing device that can be held by the user 22. For example, in some implementations, the electronic device 20 includes a smartphone, a tablet, a media player, a laptop, or the like. In some implementations, the electronic device 20 includes a wearable computing device that can be worn by the user 22. For example, in some implementations, the electronic device 20 includes a head-mountable device (HMD) or an electronic watch.

In the example of FIG. 1A, the physical object 12 is located at a distance 14 from the electronic device 20 and/or the user 22. In some implementations, the electronic device 20 includes an environmental sensor (not shown) that captures environmental data corresponding to the physical environment 10. In such implementations, the electronic device 20 uses the environmental data to determine the distance 14 between the physical object 12 and the electronic device 20 or the user 22. In some implementations, the environmental sensor includes a depth sensor (e.g., a depth camera) and the environmental data includes depth data that is captured by the depth sensor. In some implementations, the environmental sensor includes an image sensor (e.g., a camera, for example, an infrared (IR) camera or a visible light camera) and the environmental data includes image data that is captured by the image sensor. In some implementations, the electronic device 20 includes a tablet or a smartphone and the environmental sensor includes a rear-facing camera of the tablet or the smartphone that the user 22 points towards the physical object 12. In some implementations, the electronic device 20 includes an HMD and the environment sensor includes a scene-facing camera.

Referring to FIG. 1B, in various implementations, the electronic device 20 obtains visual content 30. In some implementations, the visual content 30 includes a set of one or more images that collectively represent a graphical environment 40 that is different from the physical environment 10 of the electronic device 20. In some implementations, the graphical environment 40 includes a two-dimensional (2D) environment. In some implementations, the graphical environment 40 includes a three-dimensional (3D) environment such as an XR environment. The graphical environment 40 may include various graphical objects (e.g., XR objects) such as a graphical object 42 shown in FIG. 1B. In the example of FIG. 1B, the graphical object 42 is at a distance 44 from the user 22. As such, the user 22 has to travel (e.g., walk) the distance 44 in the physical environment 10 to interact (e.g., touch and/or move) with the graphical object 42.

FIG. 1B illustrates a current trajectory 50 of the user 22 in the physical environment 10 and a dashed cube 12' that represents the physical object 12 in the physical environment 10. As can be seen in FIG. 1B, if the user 22 continues on the current trajectory 50, the user 22 will collide with the physical object 12 in the physical environment 10. If the electronic device 20 is obstructing a view of the physical object 12, then the user 22 is more likely to collide with the physical object 12 because the user 22 will be unable to see the physical object 12. For example, if the electronic device 20 is a tablet that the user 22 is holding in front of his/her face while walking along the current trajectory 50, the user 22 may not be able to see the physical object 12 as the user 22 approaches the physical object 12. As another example, if the electronic device 20 is an HMD that the user 22 is wearing around his/her head, the user 22 may not be able to see the physical object 12 because the HMD is obstructing a view of the physical object 12.

Referring to FIG. 1C, in various implementations, the electronic device 20 modifies the visual content 30 in order to prevent the user 22 from colliding with physical objects in the physical environment 10 while the user 22 is immersed in the graphical environment 40 and is navigating within the graphical environment 40 by walking in the physical environment 10. In some implementations, the electronic device 20 obtains a location 60 of the user 22 within the physical environment 10, and the electronic device 20 warps the visual content 30 based on the location 60 to generate warped visual content 70. In the example of FIG. 1C, the electronic device 20 shifts the graphical environment 40 leftward in a direction of the arrow 90. By shifting the display of the graphical environment 40 leftward in the direction of the arrow 90, the electronic device 20 triggers the user 22 to walk along a new trajectory 80 that does not intersect with the physical object 12. For example, as shown in FIG. 1C, the new trajectory 80 does not go through the dashed cube 12' that represents the physical object 12 in the physical environment 10.

While FIG. 1C illustrates a single warping operation that results in the warped visual content 70, in some implementations, the electronic device 20 generates the warped visual content 70 by performing a series of successive warps. For example, instead of performing a single large warp, the electronic device 20 can perform a series of smaller warps. Shifting the visual content 30 by smaller angles will be less noticeable than shifting the visual content by large angles thereby providing a smoother user experience to the user 22.

In some implementations, the location 60 of the user 22 indicates a position and/or an orientation of the user 22 relative to physical objects in the physical environment 10. In some implementations, the location 60 indicates the presence of physical objects that intersect with the current trajectory 50 of the user 22. In some implementations, the location 60 indicates a distance between the user 22 and the physical object 12 that is along the current trajectory 50.

Since the user 22 is immersed in the graphical environment 40, the user 22 may not be aware of his/her surroundings. For example, the user 22 may not be aware that the user 22 is walking straight into the physical object 12 because the user 22 may not have an unobstructed view of the physical object 12. As such, warping the visual content 30 and displaying the warped visual content 70 triggers the user 22 to change the current trajectory 50 to the new trajectory 80 that does not intersect with the physical object 12. Colliding into the physical object may have caused an injury to the user 22. Hence, in some implementations, presenting the warped visual content 70 prevents injuries to the user 22 and allows the user to be immersed in the graphical environment 40. For example, if the electronic device 20 is a smartphone or a tablet, presenting the warped visual content 70 reduces the need for the user 22 to look away from a display of the smartphone or the tablet. As another example, if the electronic device 20 is an HMD, presenting the warped visual content 70 reduces the need for the user 22 to dismount the HMD in order to avoid colliding with the physical object 12.

FIG. 1D illustrates another physical environment 100 that includes a front wall 110 and a side wall 112. In the example of FIGS. 1D and 1E, the electronic device 20 presents visual content 120 that includes a set of one or more images that correspond to a graphical environment 140. As shown in FIG. 1E, the graphical environment 140 includes a graphical object 142 that is a distance 144 from the user 22. As shown in FIG. 1D, the front wall 110 is a distance 111 away from the user 22. Since the distance 111 is smaller than the distance 144, if the user 22 tries to walk to the graphical object 142, the user 22 will collide with the front wall 110.

In order to prevent the user 22 from colliding with the front wall 110 as the user 22 walks towards the graphical object 142, the electronic device 20 warps the visual content 120. The electronic device 20 performs successive warping operations as the user 22 approaches the front wall 110. For example, the electronic device 20 performs a first warping operation to generate a first warped visual content 130a when the user 22 has walked a first distance d1 towards the front wall 110. The first warped visual content 130a shifts display of the graphical object 142 rightwards by a fixed amount. Displaying the first warped visual content 130a triggers the user 22 to turn rightwards in order to stay on course towards the graphical object 142.

The electronic device 20 performs a second warping operation to generate a second warped visual content 130*b* when the user 22 has walked a second distance d2. The second warped visual content 130*b* further shifts display of the graphical object 142 rightwards by the fixed amount. Displaying the second warped visual content 130*b* triggers the user 22 to further turn rightwards in order to stay on course towards the graphical object 142. Similarly, the electronic device 20 generates a third warped visual content 130*c* when the user 22 has walked a third distance d3, a fourth warped visual content 130*d* when the user 22 has walked a fourth distance d4, a fifth warped visual content 130*e* when the user 22 has walked a fifth distance d5, a sixth warped visual content 130*f* when the user 22 has walked a sixth distance d6, a seventh warped visual content 130*g* when the user 22 has walked a seventh distance d7, an eighth warped visual content 130*h* when the user 22 has walked an eighth distance d8 and a ninth warped visual content 130*i* when the user 22 has walked a ninth distance d9. As can be seen in FIG. 1E, a sum total of the distances d1, d2 . . . , and d9 is equal to the distance 144.

As can be seen in FIG. 1D, performing successive warping operations and presenting the warped visual contents 130*a*, 130*b* . . . , and 130*i* triggers the user 22 to walk along a semicircular path that does not intersect with the front wall 110 and the side wall 112. As such, the user 22 is able to navigate to the graphical object 142 in the graphical environment 140 while avoiding collisions with the front wall 110 and the side wall 112 in the physical environment 100. More generally, in various implementations, performing successive warping operations allows the user 22 to navigate within the graphical environment 140 in a safe manner by avoiding collisions with physical objects in physical environment 100 of the user 22.

Figure 2:
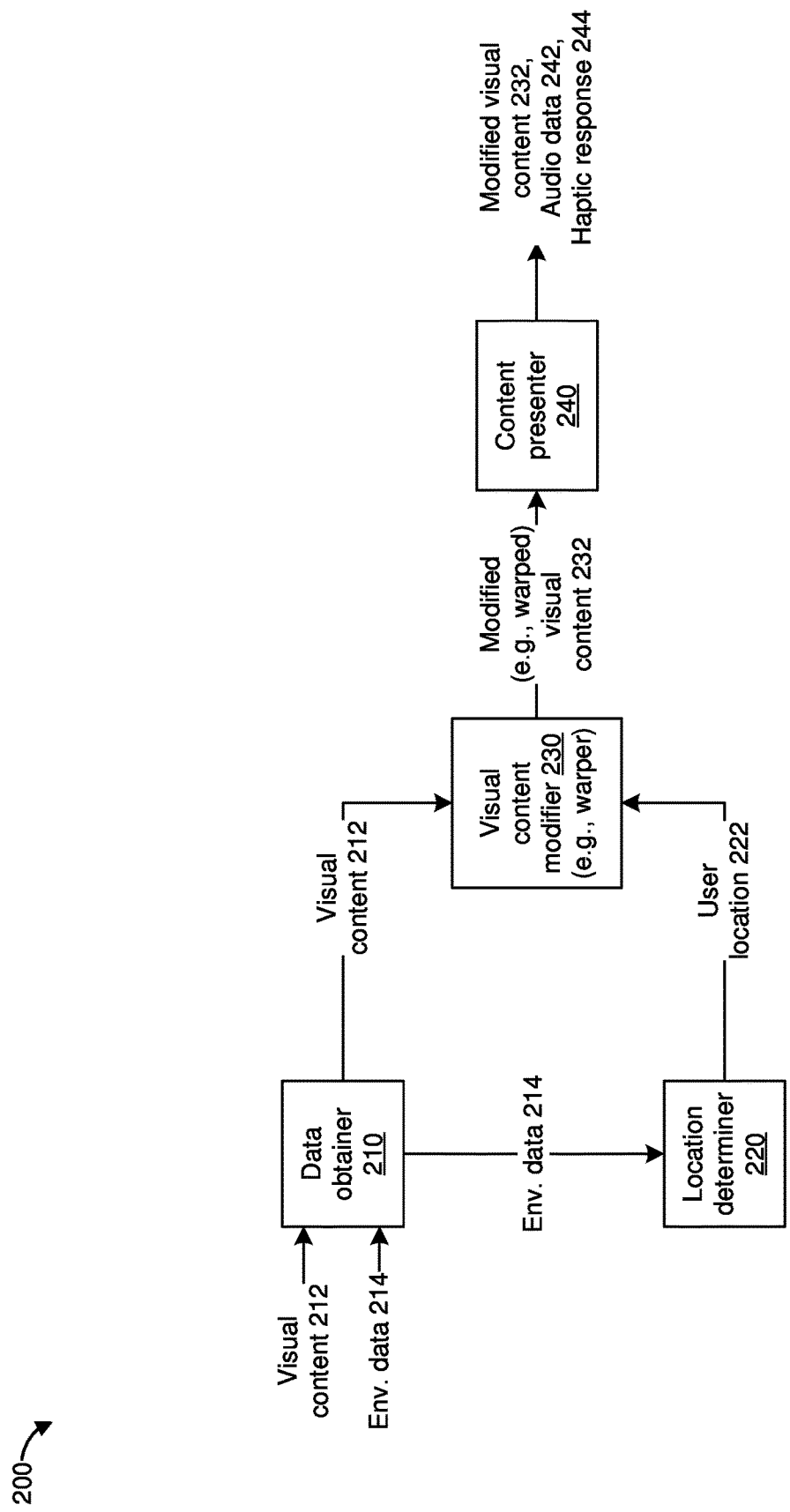
FIG. 2 is a diagram of a system that warps visual content based on user location in accordance with some implementations.

FIG. 2 illustrates a system 200 for modifying visual content (e.g., the visual content 30 shown in FIG. 1B and/or the visual content 120 shown in FIG. 1D) based on a location of a user in a physical environment. In some implementations, the system 200 is implemented by the electronic device 20 shown in FIGS. 1A-1E. For example, the system 200 resides at the electronic device 20 shown in FIGS. 1A-1E. In some implementations, the system 200 includes a data obtainer 210, a location determiner 220, a visual content modifier 230 and a content presenter 240.

In various implementations, the data obtainer 210 obtains visual content 212 (e.g., the visual content 30 shown in FIG. 1B and/or the visual content 120 shown in FIG. 1D). In some implementations, the visual content 212 includes a set of one or more images that correspond to a graphical environment (e.g., the graphical environment 40 shown in FIGS. 1B and 1C, and/or the graphical environment 140 shown in FIG. 1E). In some implementations, the data obtainer 210 retrieves the visual content 212 from a datastore. In some implementations, the data obtainer 210 receives the visual content 212 from another device.

In various implementations, a virtual layout of the graphical environment depicted by the visual content is different from a physical layout of a physical environment in which the system 200 is operating. In some implementations, the graphical environment has different dimensions than the physical environment. For example, the graphical environment may be larger than the physical environment. In some implementations, the graphical environment has graphical objects with no corresponding physical objects. In some implementations, the graphical environment does not include graphical objects that correspond to physical objects in the physical environment.

In some implementations, the data obtainer 210 obtains environmental data 214 that corresponds to the physical environment in which the system 200 is operating. For example, the environmental data 214 may correspond to the physical environment 10 shown in FIG. 1A. In some implementations, the environmental data 214 includes a set of one or more images of the physical environment. In some implementations, the environmental data 214 includes depth data that corresponds to the physical environment. In various implementations, the environmental data 214 indicates a location of a user relative to physical objects in the physical environment. For example, the environmental data 214 may include the location 60 shown in FIG. 1C.

In various implementations, the location determiner 220 uses the environmental data 214 to determine a user location 222 in the physical environment (e.g., the location 60 shown in FIG. 1C). In some implementations, the user location 222 indicates whether or not there is a physical object on a current path (e.g., a current trajectory) of the user. For example, as shown in FIG. 1B, the user location 222 may indicate that the physical object 12 lies on the current trajectory 50 of the user 22. In some implementations, the user location 222 indicates a location of the user relative to physical objects (e.g., furniture, walls, etc.) in the physical environment of the user.

In various implementations, the visual content modifier 230 modifies the visual content 212 to generate modified visual content 232 based on the user location 222. In some implementations, the visual content modifier 230 modifies the visual content 212 by warping the visual content 212 and the modified visual content 232 includes warped visual content. For example, as shown in FIG. 1C, in some implementations, the visual content modifier 230 generates the warped visual content 70 by warping the visual content 30. In some implementations, the visual content modifier 230 warps the visual content 212 in response to the user location 222 indicating that a current trajectory of the user intersects with a physical object in the physical environment. For example, the visual content modifier 230 warps the visual content 212 in response to determining that the user is moving towards a physical object and is likely to collide with the physical object if the user does not change his/her trajectory.

In various implementations, the visual content modifier 230 performs a series of successive warping operations in order to make the warping appear less noticeable. For example, as shown in FIG. 1D, the visual content modifier 230 can warp the visual content 120 by a first amount (e.g., 5 degrees) to generate the first warped visual content 130*a*. In this example, after presenting the first warped visual content 130*a* for some time, the visual content modifier 230 can warp the first warped visual content 130*a* by the first amount (e.g., 5 degrees) or a second amount (e.g., 7 degrees) to generate the second warped visual content 130*b*. By performing successive warping operations and displaying the result of each warping operation for a certain amount of time, the visual content modifier 230 enhances a user experience by making the warping less noticeable. If the user is changing his/her trajectory without noticing the changes, the user is more likely to stay immersed in the graphical environment and have a better user experience.

In some implementations, the visual content modifier 230 performs a second warping operation in response to detecting no change in the trajectory of the user after performing the first warping operation. In some implementations, the second warping operation warps the visual content 212 by a greater amount. For example, if the first warping operation warped the image by five degrees, the second warping operation can warp the image by seven degrees to increase a likelihood of triggering a change in the user's trajectory.

In various implementations, the content presenter 240 presents (e.g., displays) the modified visual content 232 generated by the visual content modifier 230. For example, as shown in FIG. 1C, the content presenter 240 displays the warped visual content 70. In some implementations, the content presenter 240 displays the modified visual content 232 for a certain amount of time or until the user has travelled a certain distance before reverting to the display of the visual content 212 or switching to the display of a further modified visual content. For example, as discussed in relation to FIGS. 1D and 1E, the content presenter 240 displays the first warped visual content 130a until the user 22 has traversed the second distance d2 in the physical environment 100.

In some implementations, the content presenter 240 outputs audio data 242 to trigger a change in a current trajectory of the user. In some implementations, outputting the audio data 242 includes outputting spatial audio that appears to emanate from a particular direction. In some implementations, the content presenter 240 outputs spatial audio from a direction in which the user needs to travel in order to avoid colliding with a physical object. For example, referring to FIG. 1C, the content presenter 240 can output the audio data 242 such that the audio data 242 appears to emanate from the left thereby triggering the user 22 to turn slightly towards the left and avoid the physical object 12. In some implementations, the content presenter 240 outputs the audio data 242 in addition to warping the visual content 212. Alternatively, in some implementations, the content presenter 240 outputs the audio data 242 instead of warping the visual content 212 (e.g., the visual content modifier 230 forgoes warping the visual content 212 and the content presenter 240 outputs the audio data 242).

In some implementations, the content presenter 240 outputs a haptic response 244 to trigger a change in a current trajectory of the user. In some implementations, the user may be wearing various haptic devices and the content presenter 240 triggers a particular haptic device to output the haptic response 244 so that the haptic response 244 appears to emanate from a direction corresponding to that particular haptic device. For example, referring to FIG. 1C, if the user is wearing a haptic device on his/her left arm and another haptic device on his/her right arm, the content presenter 240 can output the haptic response 244 via the haptic device on the left arm thereby triggering the user 22 to turn slightly towards the left and avoid the physical object 12. In some implementations, the content presenter 240 outputs the haptic response 244 in addition to warping the visual content 212. Alternatively, in some implementations, the content presenter 240 outputs the haptic response 244 instead of warping the visual content 212. In various implementations, the content presenter 240 warps the visual content 212, outputs the audio data 242 and/or outputs the haptic response 244 to change a current trajectory of the user in order to prevent the user from colliding with physical objects in the physical environment. In some implementations, the content presenter 240 outputs the audio data 242 and/or the haptic response 244 in response to detecting no change in the trajectory of the user after displaying the modified visual content 232.

Figure 3:
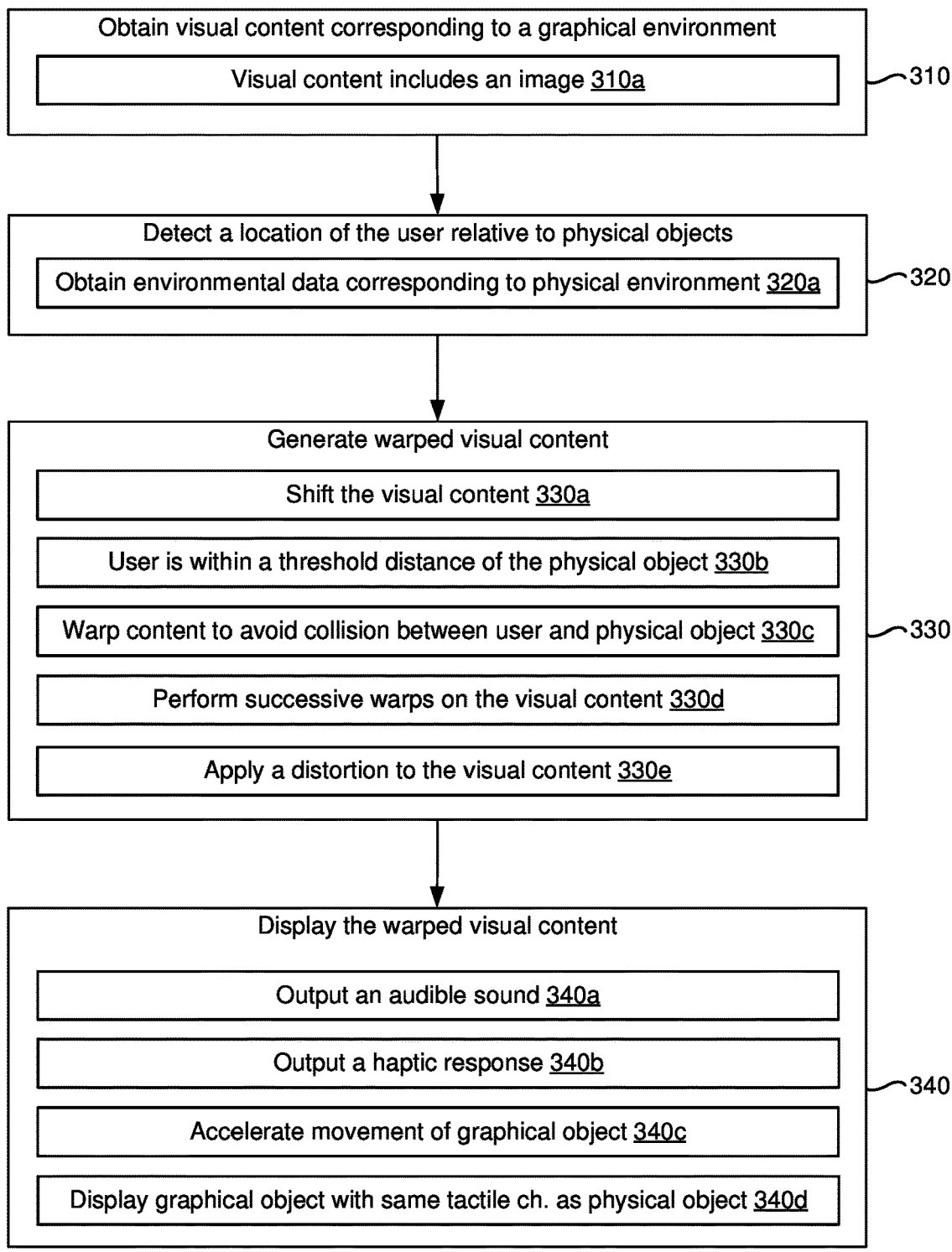
FIG. 3 is a flowchart representation of a method of warping visual content based on user location in accordance with some implementations.

FIG. 3 is a flowchart representation of a method 300 for warping visual content based on user location within a physical environment. In various implementations, the method 300 is performed by a device (e.g., the electronic device 20 shown in FIGS. 1A-1E and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining visual content corresponding to a graphical environment that is different from a physical environment of the device. For example, as shown in FIG. 1B, the electronic device 20 obtains the visual content 30 that includes a set of one or more images that depict the graphical environment 40. As described in relation to FIGS. 1A-1C, the graphical environment 40 is different from the physical environment 10. For example, the graphical environment can have different dimensions than the physical environment. As an example, the graphical environment may be much larger than the physical environment (e.g., ten times larger than the physical environment). In various implementations, the visual content includes a set of images or a video of the graphical environment. In some implementations, the visual content includes a map of the graphical environment. In some implementations, the visual content includes a 3D model of the graphical environment. In some implementations, the graphical environment is an expanded version of the physical environment (e.g., a scaled-up version of the physical environment). In some implementations, the graphical environment corresponds to a fictional location (e.g., a scene from a movie, a comic book, a novel, etc.). For example, the graphical environment may be the inside of a space ship from a movie or a TV show. In this example, the user's movement in the physical environment translates to a movement of the user's avatar in the space ship. As such, the user can explore the inside of the space ship by walking in his/her physical environment.

In some implementations, obtaining the visual content includes receiving the visual content from another device. In some implementations, obtaining the visual content includes retrieving the visual content from a datastore (e.g., from local storage or from remote storage). In some implementations, obtaining the visual content includes generating the visual content based on a user request. For example, if the user requests to view the inside of a space ship depicted in a TV show, the electronic device can access the TV show and generate a 3D version of the space ship for the user to explore based on how the space ship is depicted in the TV show.

As represented by block 320, in various implementations, the method 300 includes detecting, via the environmental sensor, a current trajectory of the user within the physical environment. For example, as shown in FIG. 1C, the electronic device 20 detects the location 60 of the user 22 within the physical environment 10. In some implementations, the environmental data includes a set of one or more images of the physical environment, and the electronic device uses the images of the physical environment to determine the location of the user within the physical environment. In some implementations, the environmental data includes depth data that is captured by a depth sensor (e.g., a depth camera), and the electronic device uses the depth data to determine the location of the user relative to physical objects in the physical environment. In various implementations, the location indicates a position and/or an orientation of the user relative to physical objects (e.g., furniture, walls, etc.) in the physical environment.

As represented by block 320a, in some implementations, the method 300 includes obtaining, via the environmental sensor, environmental data corresponding to the physical environment, and generating a volumetric mesh of the physical environment based on the environmental data. For example, in some implementations, the electronic device generates a mesh of the physical environment based on image data captured by an image sensor (e.g., a camera) of the device and/or based on depth data captured by a depth sensor (e.g., a depth camera) of the device. In some implementations, the mesh indicates locations of various physical objects in the physical environment, and the electronic device uses the mesh to determine the location of the user relative to the physical objects in the physical environment.

As represented by block 330, in various implementations, the method 300 includes generating warped visual content by warping the visual content in response to an indication that the current trajectory of the user intersects with a physical object in the physical environment. For example, as shown in FIGS. 1B and 1C, the electronic device 20 warps the visual content 30 to generate the warped visual content 70 in response to determining that the current trajectory 50 of the user 22 intersects with the physical object 12 in the physical environment 10. As represented by block 310a, in some implementations, the visual content includes an image and the warped visual content includes a warped image.

As represented by block 330a, in some implementations, warping the visual content includes shifting the visual content to change the trajectory of the user to a new trajectory that does not intersect with the physical object in the physical environment. In some implementations, the electronic device shifts the visual content in a horizontal direction. Additionally or alternatively, in some implementations, the electronic device shifts the visual content in a vertical direction. For example, as shown in FIG. 1C, the electronic device 20 shifts the display of the graphical environment 40 towards the left as indicated by the arrow 90.

As represented by block 330b, in some implementations, warping the visual content includes warping the visual content in response to detecting that the user is within a threshold distance of the physical object in the physical environment. As an example, the electronic device can warp the visual content in response to detecting that the user is within 2 feet of a wall or a coffee table.

As represented by block 330c, in some implementations, warping the visual content includes determining that the user has to turn in a particular direction to avoid colliding with the physical object in the physical environment, and warping the visual content in that particular direction to trigger the user to turn in that particular direction. For example, referring to FIGS. 1D and 1E, the electronic device 20 warps a visual content 120 rightward in response to determining that the user 22 has to turn rightwards in order to avoid colliding with the front wall 110. As another example, if the user has to veer right to avoid a coffee table, then the electronic device warps the image to the right so that the user perceives that the user is going too much towards the left and the user corrects his/her trajectory by going right.

As represented by block 330d, in some implementations, warping the visual content includes performing a plurality of successive warps on the visual content. In such implementations, each of the plurality of successive warps includes warping the visual content by less than a threshold amount. For example, as shown in FIG. 1D, the electronic device 20 warps the visual content 120 by performing nine successive warping operations. As another example, the electronic device may limit the warping such that an image is warped less than a threshold amount, for example, less than 5 degrees.

As represented by block 330e, in some implementations, generating the warped visual content includes applying a lens distortion to the visual content. For example, in some implementations, the electronic applies a poly 3k or a poly 6k distortion to the visual content. In some implementations, generating the warped visual content includes applying a radial distortion to the visual content.

As represented by block 340, in some implementations, the method 300 includes displaying the warped visual content on the display. For example, as shown in FIG. 1C, the electronic device 20 displays the warped visual content 70. In some implementations, the electronic device displays the warped visual content for a threshold amount of time. In some implementations, the electronic device displays the warped visual content until detecting a change in a current trajectory of the user. In some implementations, the method 300 includes performing additional warping (e.g., a more severe warping) in response to detecting no change in the current trajectory of the user after displaying the warped visual content for a threshold amount of time. For example, if warping an image by five degrees does not trigger a change in a current trajectory of the user, the electronic device can warp the image by an additional two degrees and display a warped image that has been warped by a sum total of seven degrees.

As represented by block 340a, in some implementations, the method 300 includes outputting an audible sound that emanates from a direction in which the visual content is warped. As an example, referring to FIG. 1C, the electronic device 20 can output spatial audio that emanates from the left to further trigger the user to walk towards the left and avoid colliding with the physical object 12. As another example, the electronic device can play a bird chirping sound from the left in order to trigger the user to walk towards the left. In some implementations, the electronic device can output sounds in addition to warping the visual content to trigger the user to change his/her current trajectory. Alternatively, in some implementations, the electronic device can forgo warping the visual content and output spatial audio to trigger the user to change his/her current trajectory.

As represented by block 340b, in some implementations, the method 300 includes outputting a haptic response from a direction in which the visual content is warped. As an example, referring to FIG. 1D, if the user 22 is wearing a haptic device on his/her left arm and another haptic device on his/her right arm, the electronic device 20 can cause the haptic device on the right arm to output a haptic response (e.g., vibrate) when the warped visual contents 130a, 130b, . . . and 130i are initially displayed. In some implementations, the electronic device can output the haptic response in addition to warping the visual content to trigger the user to change his/her current trajectory. Alternatively, in some implementations, the electronic device can forgo warping the visual content and output the haptic response to trigger the user to change his/her current trajectory.

As represented by block 340c, in some implementations, the method 300 includes detecting a movement of the user in the physical environment at a first velocity, and displaying a movement of a graphical object in the graphical environment based on the movement of the user in the physical environment at a second velocity that is a multiple of the first velocity. For example, if the user's movement in the physical environment is causing an avatar of the user to move in the graphical environment, the electronic device can accelerate the movement of the avatar in the graphical environment. For example, if the user is moving at a speed of 0.5 miles per hour in the physical environment, the electronic device can move the avatar at a speed of 5 miles per hour in the graphical environment. Accelerating the movement of the graphical object allows the user to explore a larger portion of the graphical environment by taking fewer steps in the physical environment.

As represented by block 340d, in some implementations, the method 300 includes determining a tactile characteristic of the physical object in the physical environment, and displaying, at a location in the graphical environment that corresponds to a location of the physical object in the physical environment, a graphical object with the same tactile characteristic as the physical object. As an example, if there is a fish bowl in the physical environment of the user, the electronic device can display a virtual waterfall in the graphical environment. In this example, when the user is exploring the graphical environment, an avatar of the user can touch the virtual waterfall however in reality the user would be touching the fish bowl. In some implementations, the electronic device determines the tactile characteristic of the physical object by performing instance segmentation and/or semantic segmentation. In some implementations, the electronic device identifies the tactile characteristic of the physical object by comparing the physical object with images of physical objects with known tactile characteristics.

Figure 4:
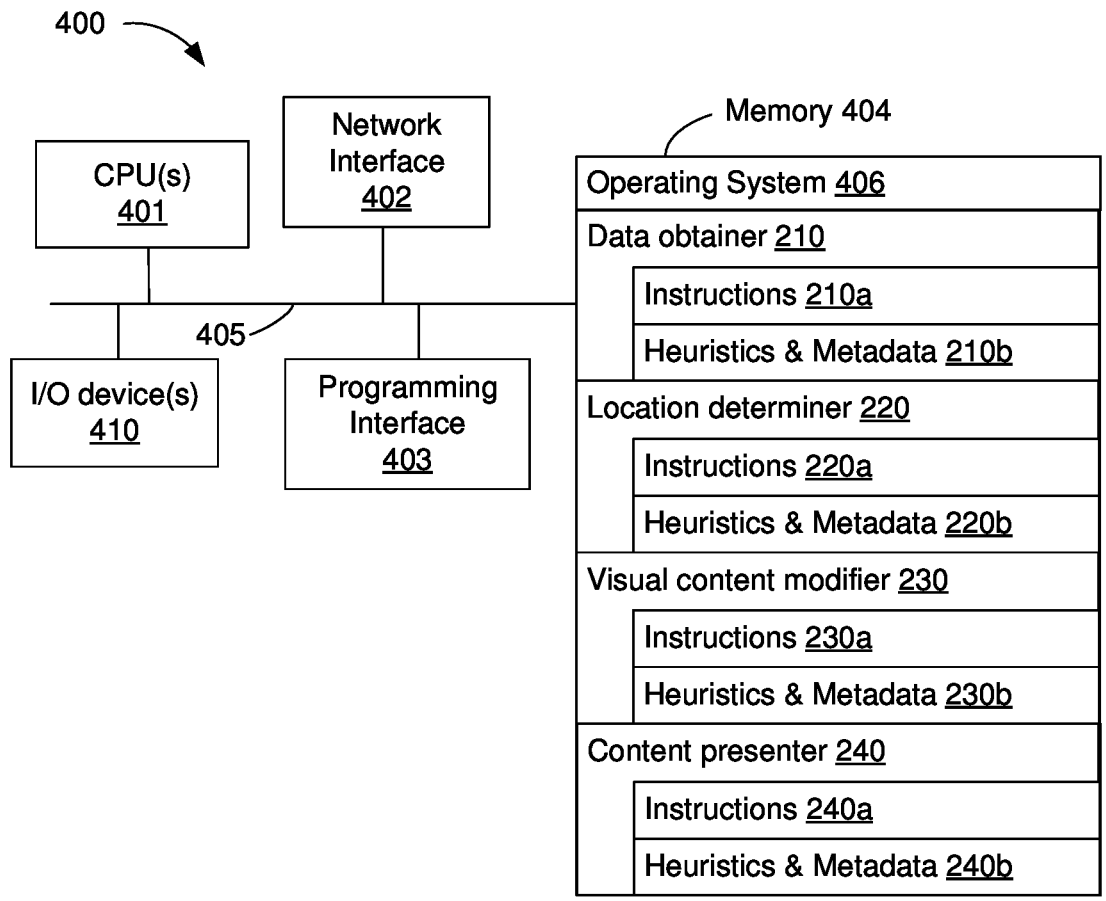
FIG. 4 is a block diagram of a device that warps visual content based on user location in accordance with some implementations.

FIG. 4 is a block diagram of a device 400 in accordance with some implementations. In some implementations, the device 400 implements the electronic device 20 shown in FIGS. 1A-1E and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, a data obtainer 210, a location determiner 220, a visual content modifier 230 and a content presenter 240. In various implementations, the device 400 performs the method 300 shown in FIG. 3.

In some implementations, the data obtainer 210 includes instructions 210a, and heuristics and metadata 210b for obtaining (e.g., receiving and/or retrieving) visual content that corresponds to a graphical environment (e.g., the visual content 30 shown in FIG. 1B, the visual content 120 shown in FIG. 1D and/or the visual content 212 shown in FIG. 2). In some implementations, the data obtainer 210 performs at least some of the operation(s) represented by block 310 in FIG. 3.

In some implementations, the location determiner 220 includes instructions 220a, and heuristics and metadata 220b for determining a location of a user relative to a physical object in a physical environment of the device 400 (e.g., the location 60 shown in FIG. 1C and/or the user location 222 shown in FIG. 2). In some implementations, the location determiner 220 performs at least some of the operation(s) represented by block 320 in FIG. 3.

In some implementations, the visual content modifier 230 includes instructions 230a, and heuristics and metadata 230b for modifying (e.g., warping) visual content to generate modified visual content (e.g., warped visual content, for example, the warped visual content 70 shown in FIG. 1C, the warped visual contents 130a, 130b, . . . , and 130i shown in FIGS. 1D and 1E, and/or the modified visual content 232 shown in FIG. 2). In some implementations, the visual content modifier 230 performs at least some of the operation(s) represented by block 330 in FIG. 3.

In some implementations, the content presenter 240 includes instructions 240a, and heuristics and metadata 240b for presenting (e.g., displaying) the modified visual content (e.g., warped visual content) generated by the visual content modifier 230. In some implementations, the content presenter 240 performs at least some of the operation(s) represented by block 340 in FIG. 3.

In some implementations, the one or more I/O devices 410 include an input device for obtaining inputs (e.g., a touchscreen for detecting user inputs). In some implementations, the one or more I/O devices 410 include an environmental sensor for capturing the environmental data 214 shown in FIG. 2. In some implementations, the one or more I/O devices 410 include a depth sensor (e.g., a depth camera) for capturing depth data corresponding to the physical environment. In some implementations, the one or more I/O devices 410 include an image sensor (e.g., a camera, for example, a visible light camera or an infrared light camera) for capturing images of the physical environment. In some implementations, the one or more I/O devices 410 include a display for displaying the warped visual content.

In various implementations, the one or more I/O devices 410 include a video pass-through display which displays at least a portion of a physical environment surrounding the device 400 as an image captured by a camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Some users may have a condition that adversely impacts their ability to move properly. For example, a user may not be able to perceive gravity and thus may not be able to walk straight. As another example, a user may have a temporary or permanent inability to walk in a straight line.

The present disclosure provides methods, systems and/or devices that warp pass-through images of a physical environment when movement of a user does not match a movement template. The device can warp a pass-through image to exaggerate a difference between a current movement and an expected movement. The exaggerated difference is more likely to trigger the user to modify his/her current movement such that the user's modified movement more closely matches the expected movement. As an example, if the user appears to be drooping a little to the left, the device warps a pass-through image of the physical environment towards the right in order to provide an appearance that the user is drooping a lot to the left. In this example, exaggerating the droop towards the left is more likely to trigger the user to modify his/her current movement by walking towards the right.

Warping pass-through images of the physical environment can also be used to trigger the user to modify his/her posture. For example, if the user is slouching a little, the device can warp pass-through images upwards in order to provide an appearance that the user is slouching a lot to trigger the user to straighten his/her back and stop slouching. In this example, exaggerating the amount of slouching by warping the pass-through images upwards is more likely to trigger the user to correct his/her posture and to stop slouching.

Figure 5C:
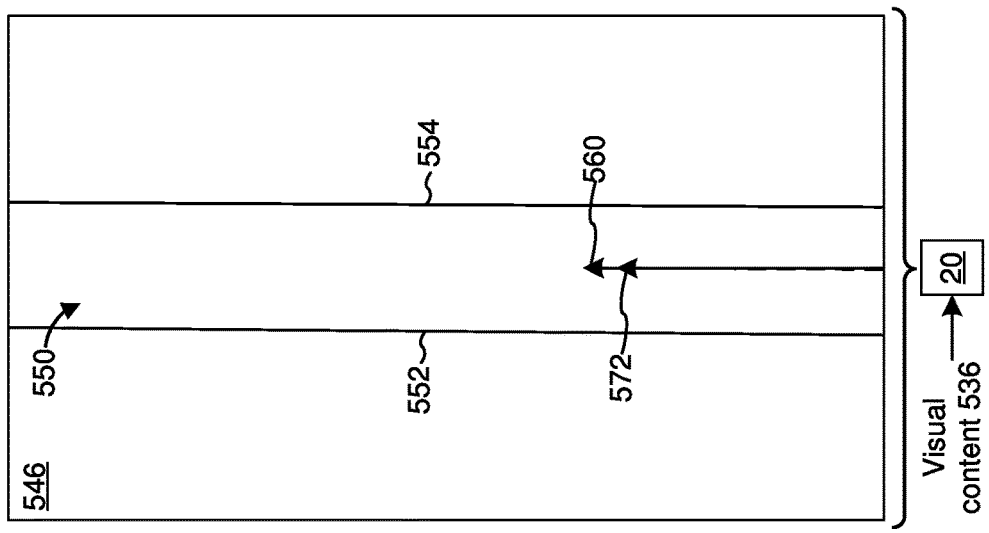
FIGS. 5A-5F are diagrams of another example operating environment in accordance with some implementations.
Figure 5B:
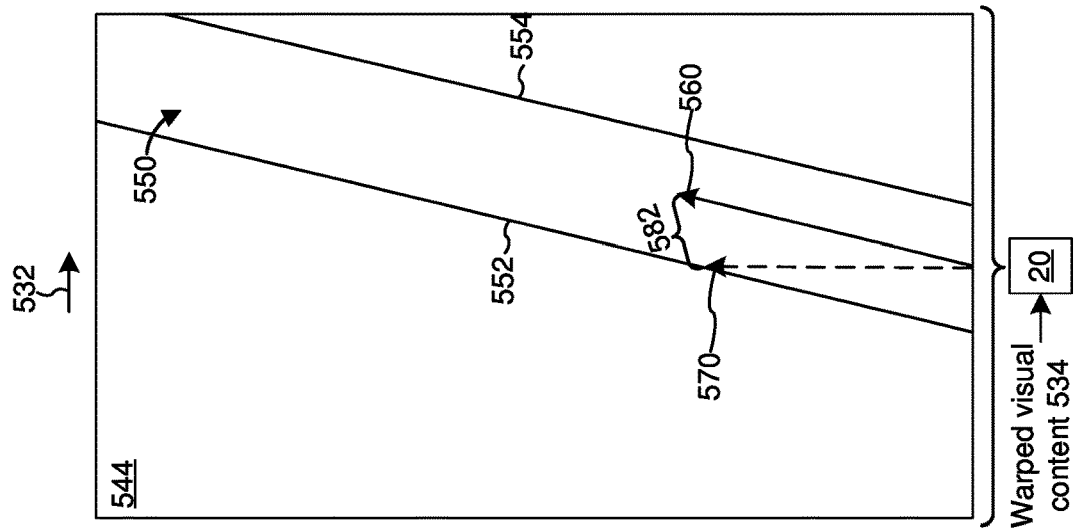
Figure 5A:
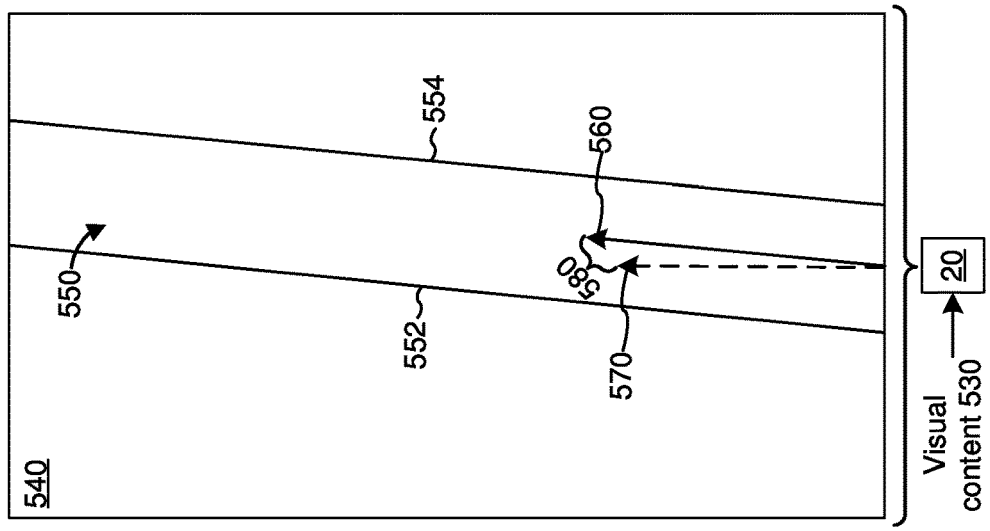

Referring to FIG. 5A, the electronic device 20 obtains visual content 530 that includes a pass-through image 540 ("image 540", hereinafter for the sake of brevity) of a physical environment of the electronic device 20. The electronic device 20 displays the visual content 530 on a display of the electronic device 20. In some implementations, the electronic device 20 includes a camera, and the electronic device 20 uses the camera to capture the visual content 530. As shown in the pass-through image 540, a user of the electronic device 20 is moving along a path 550 that is bounded by a left wall 552 and a right wall 554. For example, the user may be walking along a hallway in his/her home, office, museum or elsewhere.

FIG. 5A illustrates an expected movement 560 that is parallel to the left wall 552 and the right wall 554 so that the user does not collide with either the left wall 552 or the right wall 554. However, a current movement 570 of the user is more towards the left wall 552. If the user continues to move in accordance with the current movement 570, the user will collide with the left wall 552 and the user may get injured as a result of the collision with the left wall 552. In some implementations, the electronic device 20 determines a difference 580 between the expected movement 560 and the current movement 570. For example, the electronic device 20 performs a vector subtraction operation between an expected movement vector and a current movement vector to determine the difference 580 that can be expressed as a difference vector.

Referring to FIG. 5B, the electronic device 20 warps the pass-through image 540 to trigger the user to walk in accordance with the expected movement 560. As indicated by the arrow 532, the electronic device 20 generates warped visual content 534 by warping the visual content 530 towards the right. The warped visual content 534 includes a warped pass-through image 544 that is a warped version of the pass-through image 540. Displaying the warped visual content 534 provides an appearance that the current movement 570 of the user will result in a collision with the left wall 552 sooner than an actual collision. Displaying the warped visual content 534 provides an appearance of an exaggerated difference 582 between the expected movement 560 and the current movement 570. The exaggerated difference 582 is greater than the difference 580 (e.g., the actual difference) shown in FIG. 5A. The exaggerated difference 582 is more likely to trigger a change in the current movement 570 than the difference 580 shown in FIG. 5A because the exaggerated difference 582 is larger than the difference 580. The user is more likely to change his/her current movement 570 in response to perceiving the exaggerated difference 582.

Referring to FIG. 5C, after the user adopts a modified movement 572, the electronic device 20 switches to displaying visual content 536 that presents the physical environment from the user's new location. The visual content 536 includes a new pass-through image 546 that presents the physical environment from a different perspective (e.g., an updated point-of-view (POV)) than the pass-through image 540 shown in FIG. 5A. As can be seen in FIG. 5C, the modified movement 572 more closely matches the expected movement 560. In the example of FIG. 5C, the modified movement 572 aligns with the expected movement 560 because the user is walking along a path that is parallel to the left wall 552 and the right wall 554.

Figure 5E:
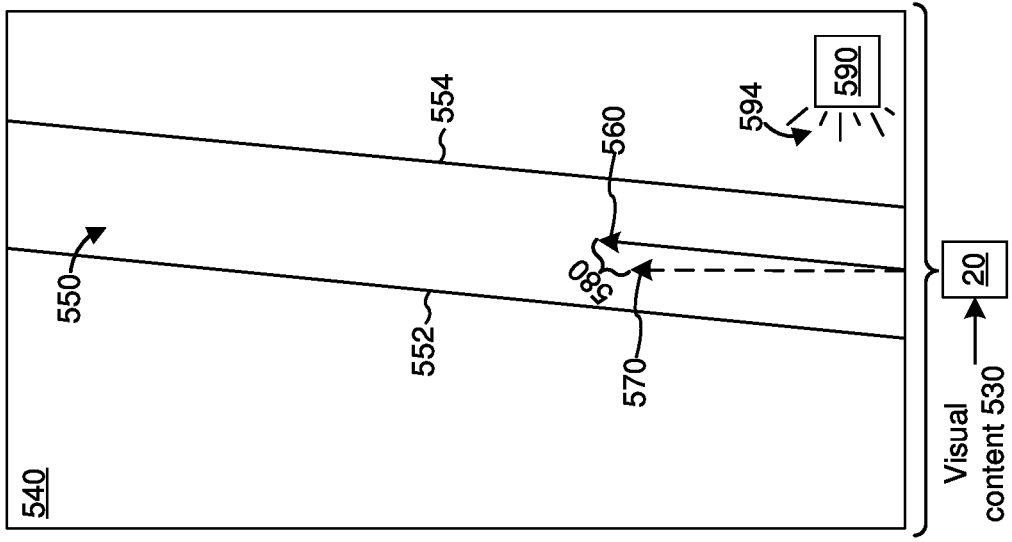
Figure 5D:
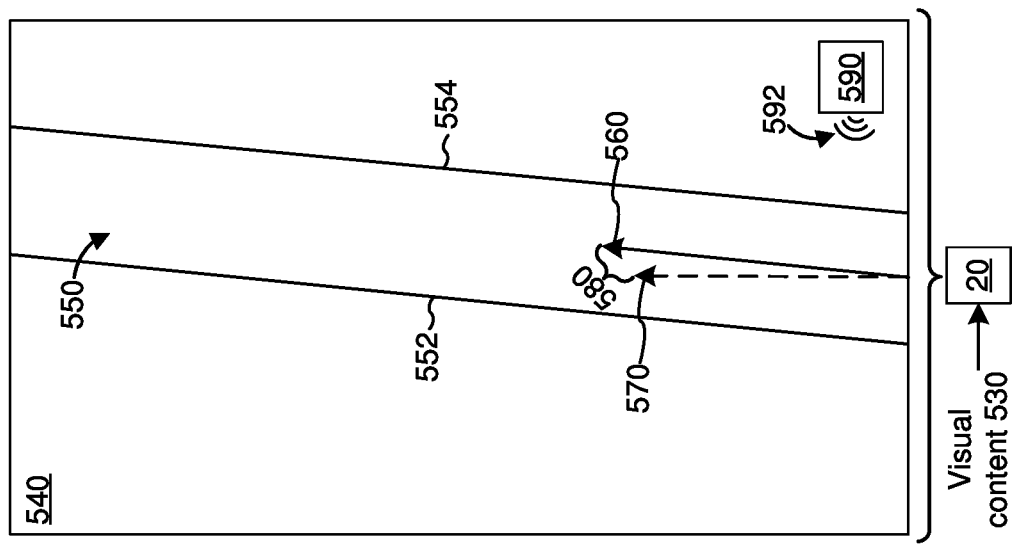

Referring to FIG. 5D, in some implementations, the electronic device 20 displays a graphical object 590 to trigger a change in the current movement 570 of the user. In some implementations, displaying the graphical object 590 triggers the user to modify his/her movement trajectory by turning towards the graphical object 590. In the example of FIG. 5D, the electronic device 20 displays the graphical object 590 towards the right because if the user modifies his/her current trajectory by turning a little towards the right, the user's modified trajectory will more closely align with the expected movement 560.

In some implementations, the electronic device 20 outputs a sound 592. In some implementations, the electronic device 20 outputs the sound 592 in the form of spatial audio so that it appears that the sound 592 is emanating from the graphical object 590. Outputting the sound 592 increases a likelihood of the user modifying his/her current movement 570 by turning a little towards the graphical object 590.

Referring to FIG. 5E, in some implementations, the electronic device 20 displays the graphical object 590 with a particular visual characteristic 594. In some implementations, the visual characteristic 594 includes a color, for example, a bright color such as yellow, orange, etc. In some implementations, the visual characteristic 594 includes brightness. In some implementations, the visual characteristic 594 is different from a visual characteristic of the physical environment in order to increase a visibility of the graphical object 590. For example, if the walls 552 and 554 are gray in color, the electronic device 20 can select a contrasting color for the graphical object 590 (e.g., yellow, red, etc.). In some implementations, the visual characteristic 594 includes flashing the graphical object 590 in order to attract the user's attention.

Figure 5F:
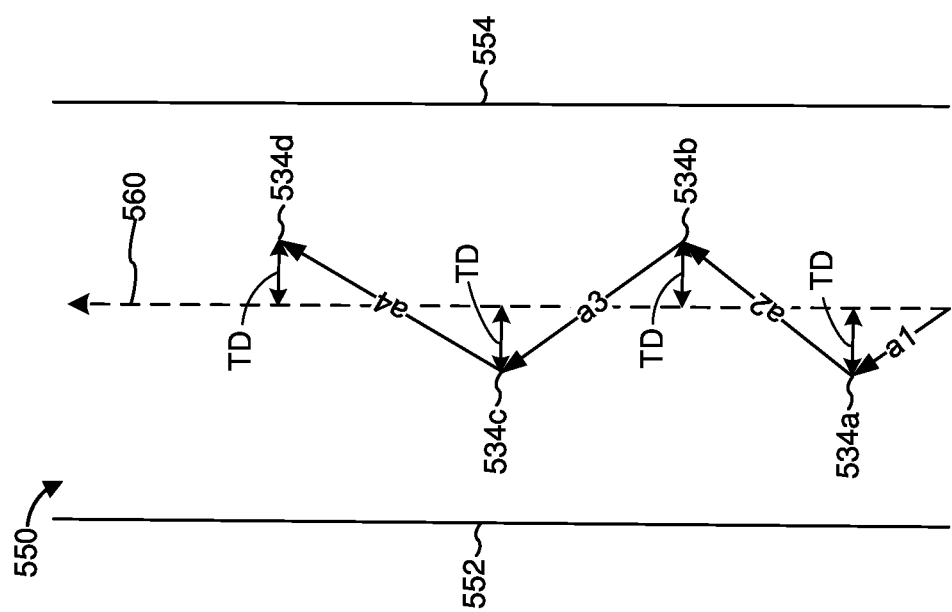

Referring to FIG. 5F, in some implementations, the electronic device 20 performs various warping operations to keep the user on track. For example, the electronic device 20 performs successive warping operations so that an average movement of the user conforms to the expected movement 560. In the example of FIG. 5F, the arrows a1, a2, a3 and a4 indicate the user's actual movement. When a distance between the user and a path corresponding to the expected movement 560 reaches (e.g., exceeds) a threshold distance TD, the electronic device 20 warps the pass-through image of the physical environment to trigger a change in the current movement of the user.

In the example of FIG. 5F, the electronic device 20 generates a first warped visual content 534a (e.g., a first warp of the pass-through image of the physical environment) after the user has traveled a first distance represented by the arrow a1 because a distance between the user and the path corresponding to the expected movement 560 reached the threshold distance TD. As indicated by the arrow a2, the user modifies his/her movement and moves rightward after the electronic device 20 displays the first warped visual content 534a.

The electronic device 20 generates a second warped visual content 534b (e.g., a second warp of the pass-through image of the physical environment) after the user has traveled a second distance represented by the arrow a2 because a distance between the user and the path corresponding to the expected movement 560 reached the threshold distance TD. As indicated by the arrow a3, the user modifies his/her movement and moves leftward after the electronic device 20 displays the second warped visual content 534b.

The electronic device 20 generates a third warped visual content 534c (e.g., a third warp of the pass-through image of the physical environment) after the user has traveled a third distance represented by the arrow a3 because a distance between the user and the path corresponding to the expected movement 560 reached the threshold distance TD. As indicated by the arrow a4, the user modifies his/her movement and moves leftward after the electronic device 20 displays the third warped visual content 534c.

The electronic device 20 generates a fourth warped visual content 534d (e.g., a fourth warp of the pass-through image of the physical environment) after the user has traveled a fourth distance represented by the arrow a4 because a distance between the user and the path corresponding to the expected movement 560 reached the threshold distance TD. In this manner the electronic device 20 triggers the user to modify his/her movement so that an average of the various user movements matches the expected movement 560.

In some implementations, an HMD being worn by the user (e.g., the user 22 shown in FIGS. 1A and 1D) presents (e.g., displays) an XR environment (e.g., the graphical environment 40 shown in FIGS. 1B and 1C, the graphical environment 140 shown in FIG. 1E, the pass-through image 540 shown in FIGS. 5A, 5D and 5E, the warped pass-through image 544 shown in FIG. 5B, and/or the new pass-through image 546 shown in FIG. 5C). In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 20 can be attached to the head-mountable enclosure. In various implementations, the head-mountable enclosure is shaped to form a receptacle for receiving another device that includes a display (e.g., the electronic device 20). For example, in some implementations, the electronic device 20 slides/snaps into or otherwise attaches to the head-mountable enclosure. In some implementations, the display of the device attached to the head-mountable enclosure presents (e.g., displays) the XR environment. In various implementations, examples of the electronic device 20 include smartphones, tablets, media players, laptops, etc.

Figure 6:
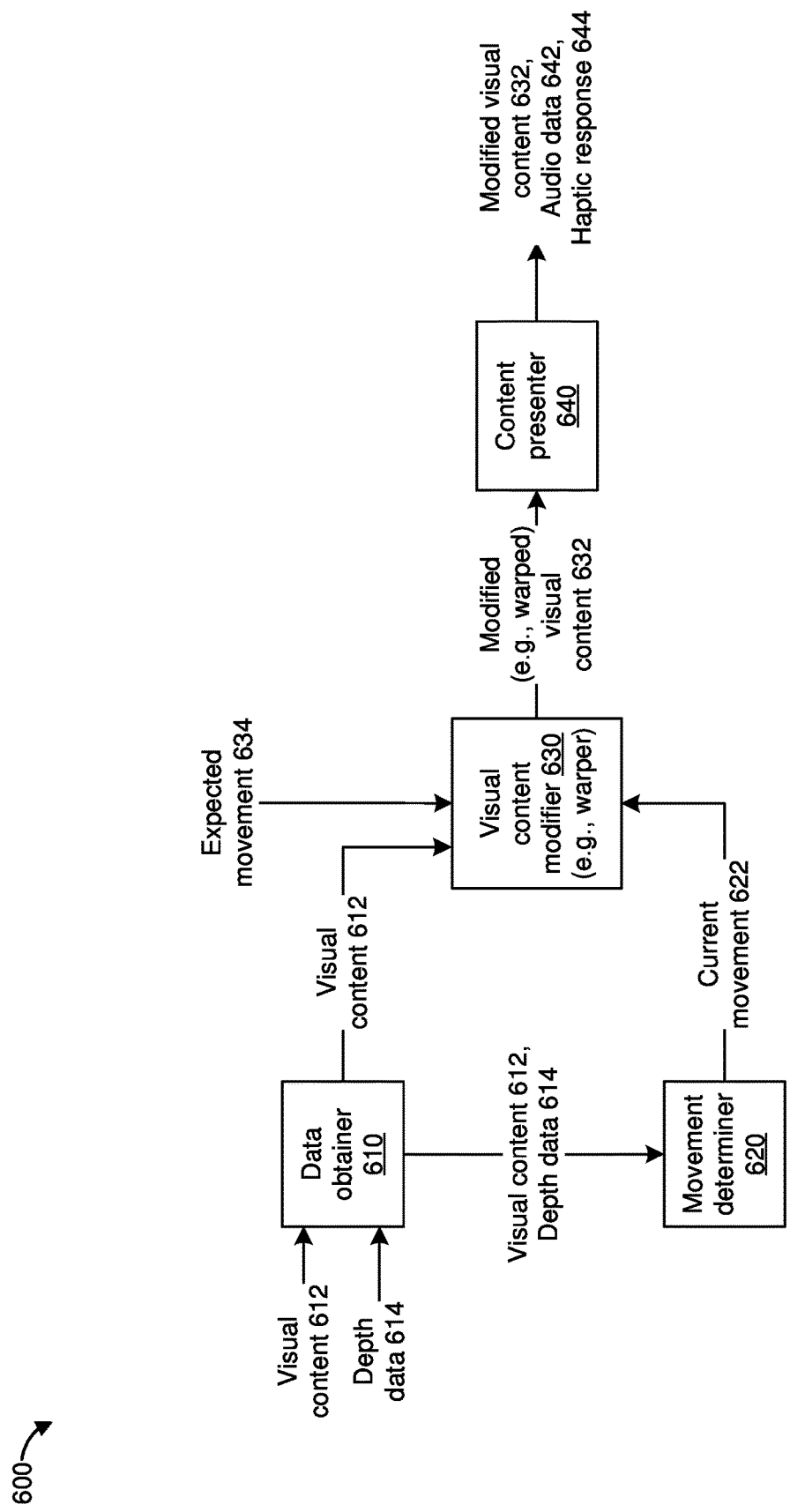
FIG. 6 is a diagram of a system that warps visual content based on user movement in accordance with some implementations.

FIG. 6 illustrates a system 600 for modifying visual content (e.g., a pass-through image of a physical environment, for example, the visual content 530 shown in FIG. 5A) based on a current movement of a user relative to an expected movement. In some implementations, the system 600 is implemented by the electronic device 20 shown in FIGS. 5A-5E. For example, the system 600 resides at the electronic device 20 shown in FIGS. 5A-5E. In some implementations, the system 600 includes a data obtainer 610, a movement determiner 620, a visual content modifier 630 and a content presenter 640.

In various implementations, the data obtainer 610 obtains visual content 612 (e.g., a pass-through image of a physical environment, for example, the visual content 530 shown in FIG. 5A). In some implementations, the visual content 612 includes an image of a physical environment. In some implementations, the visual content 612 includes an XR environment that represents a pass-through of a physical environment (e.g., the pass-through image 540 shown in FIGS. 5A-5C). In some implementations, the data obtainer 610 receives the visual content 612 from an image sensor (e.g., a camera) that captured the visual content 612.

In some implementations, the data obtainer 610 obtains depth data 614 that corresponds to the physical environment in which the system 600 is operating. For example, the depth data 614 may correspond to the physical environment of the electronic device 20 shown in FIGS. 5A-5F. In some implementations, the data obtainer 610 receives the depth data 614 from a depth sensor (e.g., a depth camera). In some implementations, the depth data 614 indicates distances between the user and physical objects in the physical environment. More generally, in various implementations, the data obtainer 610 obtains environmental data that corresponds to the physical environment (e.g., the environmental data 214 shown in FIG. 2).

In various implementations, the movement determiner 620 uses the visual content 612 and/or the depth data 614 to determine a current movement 622 of the user. For example, the movement determiner 620 identifies the current movement 570 shown in FIG. 5A. In some implementations, the current movement 622 is represented by a vector that indicates a current trajectory of the user. In some implementations, the current movement 570 indicates whether or not the user is moving along a defined path. For example, the current movement 570 may indicate whether or not the user is moving along a straight line. In some implementations, the movement determiner 620 determines the current movement 622 by analyzing the visual content 612. For example, the movement determiner 620 performs instance segmentation and/or semantic segmentation to identify physical objects in the physical environment and how the user is moving relative to the physical objects. The movement determiner 620 provides the current movement 622 to the visual content modifier 630.

In various implementations, the visual content modifier 630 modifies the visual content 612 to generate modified visual content 632 based on the current movement 622 and an expected movement 634. In some implementations, the visual content modifier 630 modifies the visual content 612 by warping the visual content 612 and the modified visual content 632 includes warped visual content. For example, as shown in FIG. 5B, in some implementations, the visual content modifier 630 generates the warped visual content 534 by warping the visual content 530. In some implementations, the visual content modifier 630 warps the visual content 612 based on a difference between the current movement 622 and the expected movement 634. In some implementations, the visual content modifier 630 warps the visual content 612 in response to the difference being greater than a threshold, and the visual content modifier 630 forgoes warping the visual content 612 in response to the difference being less than the threshold. For example, as shown in FIG. 5F, the electronic device 20 generates the warped visual contents 534a, 534b, 534c and 534d when a distance between the user and a path corresponding to the expected movement 560 reaches the threshold distance TD.

In some implementations, the visual content modifier 630 warps the visual content 612 to exaggerate the difference between the current movement 622 and the expected movement 634. For example, as shown in FIGS. 5A and 5B, the electronic device 20 warps the pass-through image 540 to the right in order to provide an appearance of an exaggerated difference 582 between the current movement 570 and the expected movement 560. Exaggerating the difference tends to increase a likelihood of triggering the user to modify his/her current movement 622 to adopt a modified movement that more closely matches the expected movement 634. In various implementations, the visual content modifier 630 is referred to as an image warper and the modified visual content 632 is referred to as warped visual content or warped image.

In various implementations, the content presenter 640 presents (e.g., displays) the modified visual content 632 generated by the visual content modifier 630. For example, as shown in FIG. 5B, the content presenter 640 displays the warped visual content 534. In some implementations, the content presenter 640 displays the modified visual content 632 until the user modifies his/her current movement 622. In some implementations, the content presenter 640 displays the modified visual content 632 until the difference between the current movement 622 and the expected movement 634 is greater than a threshold, and the content presenter 640 switches to displaying updated unmodified visual content when the difference between the expected movement 634 and a modified movement is less than the threshold. For example, as shown in FIG. 5C, the electronic device 20 switches from displaying the warped visual content 534 to displaying the visual content 536 when the modified movement 572 matches the expected movement 560. When the user modifies his/her movement to match the expected movement 634 the visual content modifier 630 forgoes modifying the pass-through image of the physical environment and the content presenter 640 presents the unmodified pass-through image.

In some implementations, the content presenter 640 outputs audio data 642 to trigger a change in a current movement of the user. In some implementations, outputting the audio data 642 includes outputting spatial audio that appears to emanate from a particular direction. In some implementations, the content presenter 640 outputs spatial audio from a direction in which the user needs to move in order to align his/her movement with the expected movement 634. For example, referring to FIG. 5D, the content presenter 640 can output the sound 592 such that the sound 592 appears to emanate from the right thereby triggering the user to turn slightly towards the right and walk along a path corresponding to the expected movement 560. In some implementations, the content presenter 640 outputs the audio data 642 in addition to warping the visual content 612. Alternatively, in some implementations, the content presenter 640 outputs the audio data 642 instead of warping the visual content 612.

In some implementations, the content presenter 640 outputs a haptic response 644 to trigger a change in a current movement of the user. In some implementations, the user may be wearing various haptic devices and the content presenter 640 triggers a particular haptic device to output the haptic response 624 so that the haptic response 644 appears to emanate from a direction corresponding to that particular haptic device. For example, referring to FIG. 5B, if the user is wearing a haptic device on his/her left arm and another haptic device on his/her right arm, the content presenter 640 can output the haptic response 644 via the haptic device on the right arm thereby triggering the user to turn slightly towards the right so that the modified movement 572 more closely matches the expected movement 560. In some implementations, the content presenter 640 outputs the haptic response 644 in addition to warping the visual content 612. Alternatively, in some implementations, the content presenter 640 outputs the haptic response 644 instead of warping the visual content 612. In various implementations, the content presenter 640 warps the visual content 612, outputs the audio data 642 and/or outputs the haptic response 644 to change the current movement 622 of the user so that a modified movement of the user more closely matches the expected movement 634.

Figure 7:
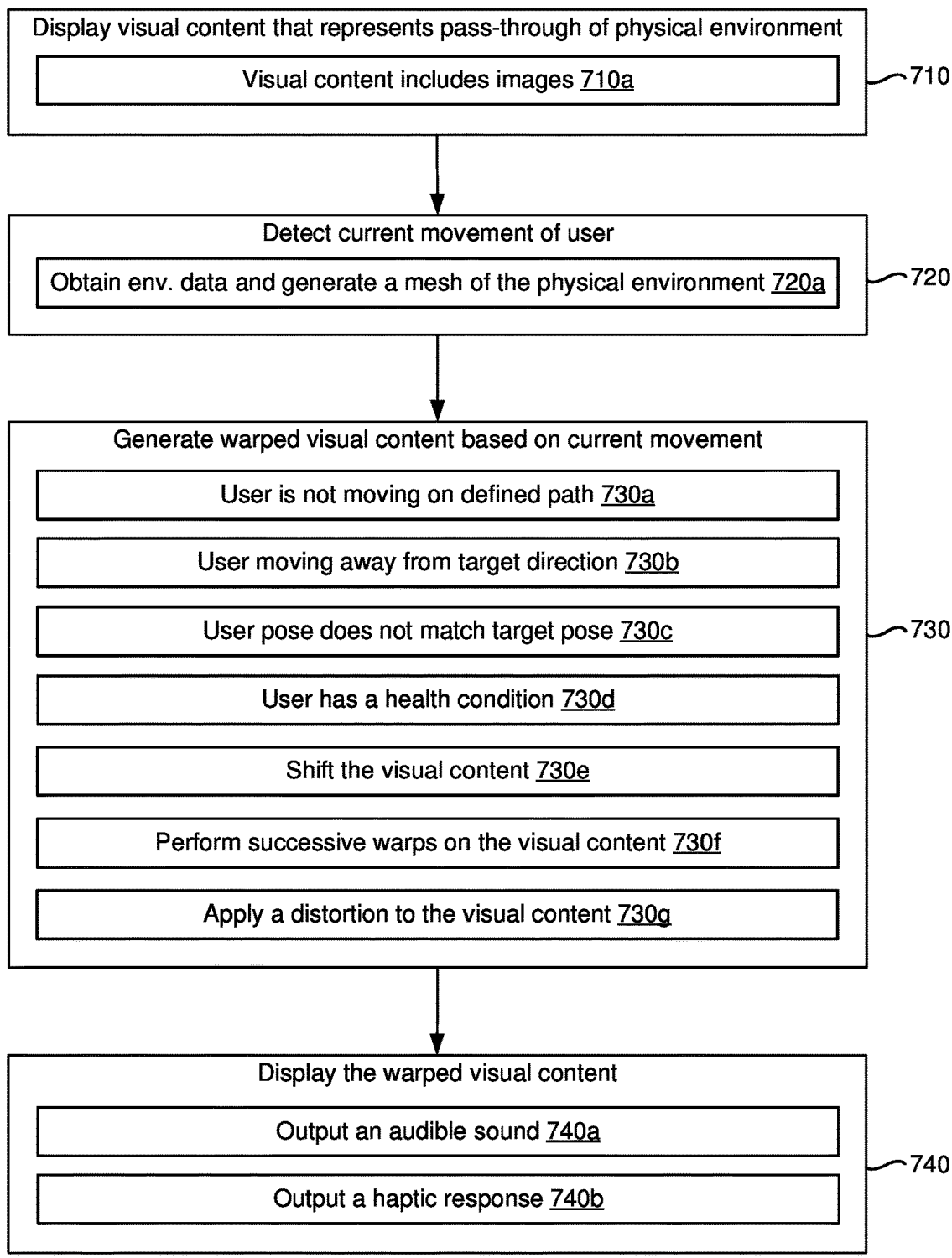
FIG. 7 is a flowchart representation of a method of warping visual content based on user movement in accordance with some implementations.

FIG. 7 is a flowchart representation of a method 700 for warping visual content based on user movement within a physical environment. In various implementations, the method 700 is performed by a device (e.g., the electronic device 20 shown in FIGS. 5A-5E and/or the system 600 shown in FIG. 6). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in various implementations, the method 700 includes displaying, on the display, visual content that represents a pass-through of a physical environment of the device. In some implementations, the visual content includes a pass-through image of the physical environment of the device. For example, as shown in FIG. 5A, the electronic device 20 displays the pass-through image 540 of the physical environment. In some implementations, the method 700 includes receiving visual content in the form of an image that is captured by an image sensor (e.g., a camera) of the device.

As represented by block 720, in various implementations, the method 700 includes detecting, via the movement sensor, a current movement of a user of the device. In some implementations, the movement sensor includes an image sensor that captures the visual content, and the method 700 includes determining the current movement of the user based on the visual content captured by the image sensor. In some implementations, the method 700 includes performing instance segmentation and/or semantic segmentation on the visual content to determine how the user is moving relative to physical objects in the physical environment. In some implementations, the movement sensor includes an accelerometer, a magnetometer and/or a gyroscope, and the method 700 includes determining the current movement of the user based on accelerometer data captured by the accelerometer, magnetometer data captured by the magnetometer and/or gyroscope data captured by the gyroscope.

As represented by block 720*a*, in some implementations, the method 700 includes obtaining, via the environmental sensor, environmental data corresponding to the physical environment, and generating a volumetric mesh of the physical environment based on the environmental data. In some implementations, the method 700 includes utilizing the volumetric mesh to determine which part of the physical environment the user is moving towards.

As represented by block 730, in some implementations, the method 700 includes generating warped visual content by warping the visual content in response to a difference between the current movement and an expected movement being greater than a threshold. For example, as shown in FIG. 5B, the electronic device 20 warps the visual content 530 to generate the warped visual content 534 in response to the difference 580 between the expected movement 560 and the current movement 570 being greater than a threshold. As represented by block 710*a*, in some implementations, the visual content includes an image and the warped visual content includes a warped image. For example, as shown in FIGS. 5A and 5B the visual content 530 includes the pass-through image 540 and the warped visual content 534 includes the warped pass-through image 544.

As represented by block 730*a*, in some implementations, the expected movement includes moving (e.g., walking, cycling, skating, etc.) on a first path with a first shape and the current movement of the user is on a second path with a second shape that is different from the first shape. For example, as shown in FIG. 5F, the expected movement 560 includes moving on a straight path between the left wall 552 and the right wall 554 and the user starts by moving leftward as indicated by arrow a1. As another example, in some implementations, the expected movement includes moving along a circular path and the user moves along a non-circular path (e.g., a straight path).

As represented by block 730*b*, in some implementations, the expected movement includes moving in a first direction and the current movement of the user is in a second direction, and warping the visual content includes shifting the visual content towards the first direction to trigger the user to move in the first direction. In some implementations, the expected movement includes moving on a straight path and the current movement of the user is not on a straight path. For example, as shown in FIG. 5F, the expected movement 560 includes moving on a straight path between the left wall 552 and the right wall 554 and the user initially starts by moving leftward as indicated by arrow a1.

As represented by block 730*c*, in some implementations, the expected movement includes adopting a first sequence of one or more poses (e.g., body poses) and the current movement indicates a second sequence of one or more poses that is different from the first sequence of one or more poses. As an example, the user may be walking hunched instead of walking straight or the user may be slouching instead of sitting upright. In some implementations, the expected movement includes adopting a first sequence of poses and the current movement includes a second sequence of poses that is different from the first sequence of poses. In some implementations, the pose is for an entire body of the user. Alternatively, in some implementations, the pose is for a particular body part of the user.

In some implementations, the expected movement includes moving a particular body part of the user in accordance with the first sequence of one or more poses and the current movement indicates movement of the particular body part in accordance with the second sequence of one or more poses that is different from the first sequence of one or more poses. As an example, the expected movement may be for the user to extend his/her arm in a particular direction (e.g., in front of the user) while he/she may be extending his/her arm in another direction (e.g., sideways).

In some implementations, the expected movement includes moving an entire body of the user in accordance with the first sequence of one or more poses and the current movement indicates movement of the entire body of the user in accordance with the second sequence of one or more poses that is different from the first sequence of one or more poses. As an example, the expected movement may be for the user to walk upright whereas the user may currently be walking while slouching his/her back.

As represented by block 730*d*, in some implementations, warping the visual content includes warping the visual content in response to obtaining an indication of a condition (e.g., a health condition) that adversely impacts the current movement of the user. For example, the electronic device can warp pass-through images if the user is unable to walk properly. As such, warping the visual content may in some circumstances serve as a movement aide for the user and/or as a rehabilitation technique for the user.

In some implementations, an amount of warping is a function of a severity of the condition. For example, if the condition is severe then the warping is relatively large. In some implementations, the threshold is a function of a severity of the condition. For example, the threshold can be proportional to or inversely proportional to the severity of the condition. In some implementations, the method 700 includes receiving a user input that specifies the condition. For example, the user can specify his/her condition as part of a user profile. As another example, the user can consent to providing access to his/her health records. Additionally or alternatively, in some implementations, the method 700 includes determining the condition (e.g., predicting an existence of the condition) based on the difference between the current movement and the expected movement. In some implementations, the expected movement corresponds to a baseline movement associated with a person that lacks the condition.

As represented by block 730*e*, in some implementations, warping the visual content includes shifting the visual content to change the current movement of the user to a new movement that is within the threshold of the expected movement. For example, as shown in FIGS. 5A and 5B. the electronic device 20 shifts the pass-through image 540 rightwards to generate the warped pass-through image 544. In some implementations, the electronic device shifts the visual content horizontally. Additionally or alternatively, in some implementations, the electronic device shifts the visual content vertically.

As represented by block 730*f*, in some implementations, warping the visual content includes performing a plurality of successive warps on the visual content. Each of the plurality of successive warps includes warping the visual content by less than a threshold amount (e.g., less than 5 degrees). Performing a series of small warps is less noticeable and less disruptive than performing a single large warping operation thereby enhancing a user experience of the electronic device.

As represented by block 730*g*, in some implementations, the method 700 includes applying a lens distortion to the visual content (e.g., a poly 3k distortion or a poly 6k distortion). In some implementations, the method 700 includes applying a radial distortion to the visual content.

As represented by block 740, in various implementations, the method 700 includes displaying the warped visual content on the display. For example, as shown in FIG. 5B, the electronic device 20 displays the warped pass-through image 544. As described herein, displaying the warped visual content increases a likelihood of triggering a change in the user's current movement and resulting in a modified movement that more closely matches the expected movement.

As represented by block 740*a*, in some implementations, the method 700 includes outputting an audible sound that emanates from a direction in which the visual content is warped. For example, as shown in FIG. 5D, the electronic device 20 outputs the sound 592 to trigger the user to turn slightly to the right and adopt a modified movement that more closely matches the expected movement 560.

As represented by block 740*b*, in some implementations, the method 700 includes outputting a haptic response from a direction in which the visual content is warped. For example, with reference to FIGS. 5D and 5E, the electronic device 20 can nudge the user's right arm to indicate that the user has to turn slightly to the right.

Figure 8:
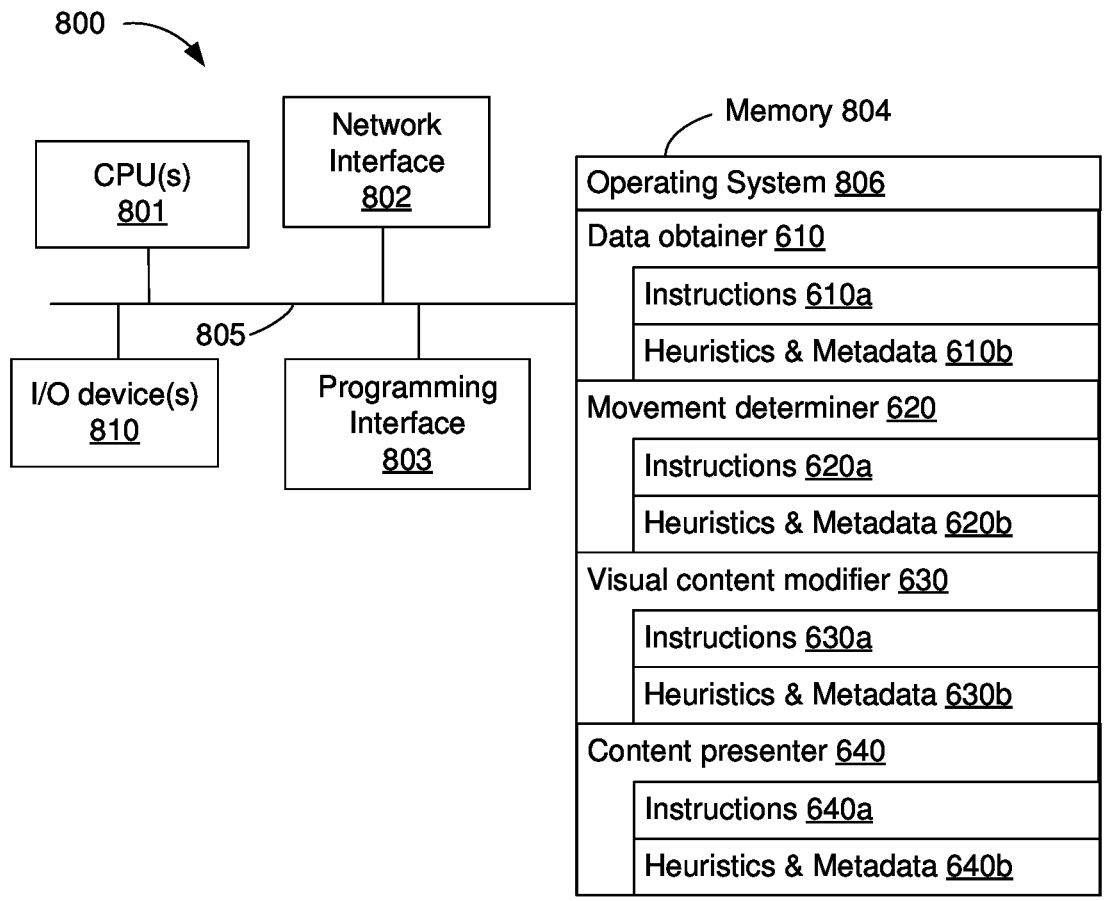
FIG. 8 is a block diagram of a device that warps visual content based on user movement in accordance with some implementations.

FIG. 8 is a block diagram of a device 800 in accordance with some implementations. In some implementations, the device 800 implements the electronic device 20 shown in FIGS. 5A-5E and/or the system 600 shown in FIG. 6. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the data obtainer 610, the movement determiner 620, the visual content modifier 630 and the content presenter 640. In various implementations, the device 800 performs the method 700 shown in FIG. 7.

In some implementations, the data obtainer 610 includes instructions 610*a*, and heuristics and metadata 610*b* for obtaining (e.g., receiving and/or retrieving) visual content that corresponds to a pass-through of a physical environment (e.g., the visual content 530 shown in FIG. 5A, the visual content 536 shown in FIG. 5C and/or the visual content 612 shown in FIG. 6). In some implementations, the data obtainer 610 performs at least some of the operation(s) represented by block 710 in FIG. 7.

In some implementations, the movement determiner 620 includes instructions 620*a*, and heuristics and metadata 620*b* for determining a current movement of a user (e.g., the current movement 622 shown in FIG. 6). In some implementations, the movement determiner 620 performs at least some of the operation(s) represented by block 720 in FIG. 7.

In some implementations, the visual content modifier 630 includes instructions 630*a*, and heuristics and metadata 630*b* for modifying (e.g., warping) visual content to generate modified visual content (e.g., warped visual content, for example, the warped visual content 534 shown in FIG. 5B, the warped visual contents 534*a*, 534*b*, 534*c* and 534*d* shown in FIG. 5F, and/or the modified visual content 632 shown in FIG. 6). In some implementations, the visual content modifier 630 performs at least some of the operation(s) represented by block 730 in FIG. 7.

In some implementations, the content presenter 640 includes instructions 640*a*, and heuristics and metadata 640*b* for presenting (e.g., displaying) the modified visual content (e.g., warped visual content) generated by the visual content modifier 630. In some implementations, the content presenter 640 performs at least some of the operation(s) represented by block 740 in FIG. 7.

In some implementations, the one or more I/O devices 810 include an input device for obtaining inputs (e.g., a touchscreen for detecting user inputs). In some implementations, the one or more I/O devices 810 include an environmental sensor for capturing environmental data. In some implementations, the one or more I/O devices 810 include a depth sensor (e.g., a depth camera) for capturing the depth data 614 shown in FIG. 6. In some implementations, the one or more I/O devices 810 include an image sensor (e.g., a camera, for example, a visible light camera or an infrared light camera) for capturing the visual content 612 shown in FIG. 6. In some implementations, the one or more I/O devices 810 include a display for displaying the warped visual content. In some implementations, the one or more I/O devices 810 includes a movement sensor for detecting movement of a user.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

In various implementations, the one or more I/O devices 810 include a video pass-through display which displays at least a portion of a physical environment surrounding the device 800 as an image captured by a camera. In various implementations, the one or more I/O devices 810 include an optical see-through display which is at least partially transparent and passes light emitted by or reflected off the physical environment.

It will be appreciated that FIG. 8 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 8 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
    at a device including a display, an environmental sensor, one or more processors and a non-transitory memory:
        obtaining visual content corresponding to a graphical environment that is different from a physical environment of the device;
        detecting, via the environmental sensor, a current trajectory of a user within the physical environment corresponding to a first path between the user and an object in the graphical environment;
        generating warped visual content by warping the visual content in response to an indication that the current trajectory of the user intersects with a physical object in the physical environment, wherein a location of the object in the graphical environment is shifted to change the current trajectory to a new trajectory of the user within the physical environment that does not intersect with the physical object corresponding to a second path between the user and the object in the graphical environment; and
        displaying the warped visual content on the display.

2. The method of claim 1, wherein shifting the location of the object comprises shifting the location of the object in a horizontal direction.

3. The method of claim 1, wherein shifting the location of the object comprises shifting the location of the object in a vertical direction.

4. The method of claim 1, wherein warping the visual content comprises warping the visual content in response to detecting that the user is within a threshold distance of the physical object in the physical environment.

5. The method of claim 1, wherein warping the visual content comprises:
    determining that the user has to turn in a particular direction to avoid colliding with the physical object in the physical environment; and
    warping the visual content in that particular direction to trigger the user to turn in that particular direction.

6. The method of claim 1, wherein warping the visual content comprises:
    performing a plurality of successive warps on the visual content, wherein each of the plurality of successive warps comprises warping the image by less than a threshold amount.

7. The method of claim 1, further comprising outputting an audible sound that emanates from a direction in which the visual content is warped.

8. The method of claim 1, further comprising outputting a haptic response from a direction in which the visual content is warped.

9. The method of claim 1, further comprising:
    detecting a movement of the user in the physical environment at a first velocity; and
    displaying a movement of a graphical object in the graphical environment based on the movement of the user in the physical environment at a second velocity that is a multiple of the first velocity.

10. The method of claim 1, further comprising:
    determining a tactile characteristic of the physical object in the physical environment; and
    displaying, at a location in the graphical environment that corresponds to a location of the physical object in the physical environment, a graphical object with the same tactile characteristic as the physical object.

11. The method of claim 1, wherein generating the warped visual content comprises applying a lens distortion to the visual content.

12. The method of claim 1, wherein generating the warped visual content comprises applying a radial distortion to the visual content.

13. The method of claim 1, wherein the visual content comprises an image and the warped visual content comprises a warped image.

14. The method of claim 1, further comprising:
    obtaining, via the environmental sensor, environmental data corresponding to the physical environment; and
    generating a volumetric mesh of the physical environment based on the environmental data.

15. The method of claim 1, further comprising:
    displaying the warped visual content in response to a difference between the current trajectory of the user and an expected trajectory of the user being not greater than a threshold distance; and ceasing to display the warped visual content in response to the difference between the current trajectory of the user and the expected trajectory of the user being greater than a threshold distance.

16. A device comprising:
one or more processors;
an environmental sensor;
a display;
a non-transitory memory; and
one or more programs stored in the non-transitory memory, which, when executed by the one or more processors, cause the device to:
  obtain visual content corresponding to a graphical environment that is different from a physical environment of the device;
  detect, via the environmental sensor, a current trajectory of the user within the physical environment corresponding to a first path between the user and an object in the graphical environment;
  generate warped visual content by warping the visual content in response to an indication that the current trajectory of the user intersects with a physical object in the physical environment, wherein a location of the object in the graphical environment is shifted to change the current trajectory to a new trajectory of the user within the physical environment that does not intersect with the physical object corresponding to a second path between the user and the object in the graphical environment; and
  display the warped visual content on the display.

17. The device of claim 16, wherein warping the visual content comprises warping the visual content in response to detecting that the user is within a threshold distance of the physical object in the physical environment.

18. A non-transitory memory storing one or more programs, which, when executed by one or more processors of a device including a display and an environmental sensor, cause the device to:
  obtain visual content corresponding to a graphical environment that is different from a physical environment of the device;
  detect, via the environmental sensor, a current trajectory of the user within the physical environment corresponding to a first path between the user and an object in the graphical environment;
  generate warped visual content by warping the visual content in response to an indication that the current trajectory of the user intersects with a physical object in the physical environment, wherein a location of the object in the graphical environment is shifted to change the current trajectory to a new trajectory of the user within the physical environment that does not intersect with the physical object corresponding to a second path between the user and the object in the graphical environment; and
  display the warped visual content on the display.

19. The non-transitory memory of claim 18, wherein warping the visual content comprises:
  determining that the user has to turn in a particular direction to avoid colliding with the physical object in the physical environment; and
  warping the visual content in that particular direction to trigger the user to turn in that particular direction.

* * * * *